(12) United States Patent
Ohara

(10) Patent No.: US 9,254,718 B2
(45) Date of Patent: Feb. 9, 2016

(54) PNEUMATIC RADIAL TIRE

(75) Inventor: Masaaki Ohara, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 659 days.

(21) Appl. No.: 13/618,432

(22) Filed: Sep. 14, 2012

(65) Prior Publication Data

US 2013/0139936 A1    Jun. 6, 2013

(30) Foreign Application Priority Data

Dec. 6, 2011  (JP) .................................. 2011-266959

(51) Int. Cl.
  *B60C 13/02* (2006.01)
  *B60C 11/11* (2006.01)
  *B60C 9/20* (2006.01)

(52) U.S. Cl.
  CPC ............... *B60C 9/2006* (2013.04); *B60C 11/11* (2013.01); *B60C 13/02* (2013.01); *B60C 2011/1361* (2013.04); *B60C 2200/14* (2013.04)

(58) Field of Classification Search
  CPC  B60C 11/11; B60C 13/02; B60C 2011/1361; B60C 9/2006; B60C 2200/14; B60C 2200/06; B60C 2200/065
  USPC ............... 152/209.11, 209.16, 506, 534, 605, 152/523, 555, 240, 524, 569; D12/506, D12/534–537, 569–572, 605
  See application file for complete search history.

(56) References Cited

U.S. PATENT DOCUMENTS

| | | | |
|---|---|---|---|
| 4,462,448 A * | 7/1984 | Kawaguchi et al. | 152/542 |
| 4,930,559 A * | 6/1990 | Takehara et al. | 152/531 |
| 5,373,884 A | 12/1994 | Kamegawa et al. | |
| 6,189,586 B1 | 2/2001 | Guidry | |
| D578,956 S * | 10/2008 | Dixon et al. | D12/579 |
| 2006/0180259 A1 | 8/2006 | Kajita | |

(Continued)

FOREIGN PATENT DOCUMENTS

| | | |
|---|---|---|
| JP | 55-91408 A | 7/1980 |
| JP | 60-107402 A | 6/1985 |

(Continued)

OTHER PUBLICATIONS

Chinese Office Action dated Dec. 2, 2014, issued in Chinese Application No. 201210519676.2; w/English translation. (12 pages).

(Continued)

*Primary Examiner* — Eric Hug
(74) *Attorney, Agent, or Firm* — Westerman, Hattori, Daniels & Adrian, LLP

(57) ABSTRACT

A pneumatic radial tire includes three or less steel belt layers, wherein a first block and a second block extending in an outer side than the first block are alternately provided in a tire circumferential direction on a ground edge region of a tread part. An annular region extending in a circumferential direction is provided on the outer surface of an outer side than a maximum width position in a side wall part, and plural projections are provided side by side on the annular region. An outer thin wall part continuing along an outer circumferential edge of the annular region and an inner thin wall part continuing along an inner circumferential edge of the annular region are provided, and the outer thin wall part is arranged adjacent to an inner radius height and inside of the inner radius height.

16 Claims, 7 Drawing Sheets

(56) References Cited

U.S. PATENT DOCUMENTS

| | | |
|---|---|---|
| 2008/0210355 A1* | 9/2008 | Harvey et al. .............. 152/209.8 |
| 2009/0107600 A1 | 4/2009 | Missik-Gaffney et al. |
| 2010/0043934 A1 | 2/2010 | Harvey |
| 2010/0288409 A1 | 11/2010 | Ohara |

FOREIGN PATENT DOCUMENTS

| | | |
|---|---|---|
| JP | 61-081207 A | 4/1986 |
| JP | 62-004611 A | 1/1987 |
| JP | 01-087903 U | 6/1989 |
| JP | 03-031008 A | 2/1991 |
| JP | 04-218413 A | 8/1992 |
| JP | 06-024211 A | 2/1994 |
| JP | 10-138713 A | 5/1998 |
| JP | 2000-280711 A | 10/2000 |
| JP | 2000-313206 A | 11/2000 |
| JP | 2003-112505 A | 4/2003 |
| JP | 2006-219087 A | 8/2006 |
| JP | 2010-188975 A | 9/2010 |
| JP | 2010-264962 A | 11/2010 |
| JP | 2011-051573 A | 3/2011 |

OTHER PUBLICATIONS

Office Action dated Aug. 25, 2015, Issued in counterpart Japanese Application No. 2011-266959, with English translation. (6 pages).
Office Action dated Nov. 17, 2015, issued in German Patent Application No. 102012023298.5 with English translation (8 pages).

* cited by examiner

PNEUMATIC RADIAL TIRE

CROSS-REFERENCE TO RELATED APPLICATIONS

This application is based upon and claims the benefit of priority from the prior Japanese Patent Application No. 2011-266959, filed on Dec. 6, 2011; the entire contents of which are incorporated herein by reference.

BACKGROUND

1. Technical Field

The disclosure relates to a pneumatic radial tire.

2. Related Art

In a pneumatic radial tire for the purpose of running rough road, a technique of providing plural projections arranged along a tire circumferential direction on a side wall part is conventionally known (for example, see JP-A-2010-188975). The projections have a function to generate traction by shear resistance when a tire sank in a muddy ground, and are provided for the purpose of securing driving performance on a muddy ground. Furthermore, it is known that external damage resistance performance during running rough road is improved by the projections.

Off-road races include a race of running not only muddy ground and sandy ground, but rocky area such as rocky mountain. In the case of running rocky area, a tire is adjust to have low inner pressure in order to improve road surface follow-up performance by utilizing deformation of a tire. Thus, in the case of running the rocky area with a tire having low inner pressure, particularly in the case of running through rocky mountain composed of piled large rocks having a diameter of 1 meter or more, the tire cannot develop sufficient driving force under grounding conditions that blocks on a tread surface contact the surface of rocks in a form of line contact or point contact. Therefore, to obtain driving performance, grounding conditions are required such that the blocks on the tread surface deform so as to wrap rocks, and contact the surface of rocks in surface contact.

When a tire has low inner pressure, vertical rigidity of the tire is decreased due to the decrease in bending rigidity of a side wall part. However, regarding surface rigidity of a tread, a constant region on a tread surface is relatively gently deformed so as to place a dish bottom upward, due to a hoop effect of a steel belt layer embedded in a tread part. Therefore, for example, in the case of grounding acute-angled rocks, there is a limit to increase wrapping property by the blocks on the tread surface.

It is considered to weaken the hoop effect by reducing the number of lamination of steel belt layers or decreasing a diameter of a steel cord in a belt layer. However, where the hoop effect is weakened, running performance on ordinary paved road and non-paved road, and load resistance are reduced. Thus, there is a limit to weaken the hoop effect. For this reason, it is desired to increase deformation of blocks on a tread surface by adjustment of air pressure, particularly under low inner pressure conditions.

On the other hand, where projections are simply provided on a side wall part as in JP-A-2010-188975, bending rigidity of the side wall part is increased, and the effect that the projections support local deformation of the tread surface is developed. For this reason, wrapping property on the tread surface tends to be deteriorated.

JP-A-2010-264962 discloses a pneumatic tire for running rocky area, wherein a projection in a circumferential direction annularly extending along a tire circumferential direction and plural projections in a radial direction extending from the projection in a circumferential direction to a tire radial direction are provided on an outer surface of a side wall part. However, this document discloses that the projection in a circumferential direction and the projections in a radial direction are provided in order to improve damage resistance of a tire when run-off of the tire has occurred in a rocky area, and does not disclose road surface follow-up performance during running with a low inner pressure tire in a rocky area.

On the other hand, JP-A-61-081207 discloses that vertical deflection is increased by providing plural grooves in a circumferential direction on an outer surface of a side wall part in a wavy shape in cross-section. However, this document has an object to obtain flexing action in the side wall part, and does not aim at local deformation of a tread surface under low inner pressure condition. Actually, in the case of providing the grooves in a wavy shape as in this document, load diffusion is performed to the respective groove parts. Therefore, it is difficult to obtain local deformation on the tread surface. Furthermore, in the case of providing plural grooves in a circumferential direction in the vicinity of a tire maximum width position in a close contact state, deformation may be impaired by that wall surfaces of the grooves in a circumferential direction contact with each other under large deformation.

SUMMARY

The pneumatic radial tire according to an embodiment has a tire axis, a tire width direction parallel to the tire axis, a circumferential direction running along a circle or an arc centered on the tire axis, an inner radius height that is a height from the tire axis and is tantamount to a maximum inner radius of the tire about the tire axis, and a maximum width position having a maximum outer width in the tire width direction when projections on outer face of the tire are excluded. The pneumatic tire includes a pair of bead parts; a pair of side wall parts each extending from one of the bead parts to a respective side wall outer edge in a radial direction; a tread part connecting both side wall outer edges of those side wall parts and having a grounding edge region adjacent to the side wall outer edge; a carcass ply extending through the side wall part from the tread part and locked by the bead part; and three or less steel belt layers arranged at outer circumferential side of the carcass ply in the tread part. First and second blocks are alternately arranged in the circumferential direction in the grounding edge region of the tread part, and the second blocks have outer end faces arranged at outside, in the tire width direction, of respective outer faces of the first blocks. An annular region extending over the entire circumference in the circumferential direction is provided on an outer surface of the side wall part. The annular region has a plurality of projections that are arranged side by side in the circumferential direction. The annular region is arranged at outside of the maximum width position, in the radial direction. An outer thin wall part continuing in the circumferential direction along an outer circumferential edge of the annular region is provided. The outer thin wall part is arranged in vicinity of the inner radius height and inside of the inner radius height. An inner thin wall part continuing in the circumferential direction along an inner circumferential edge of the annular region is provided.

DETAILED DESCRIPTION

Figure 1:
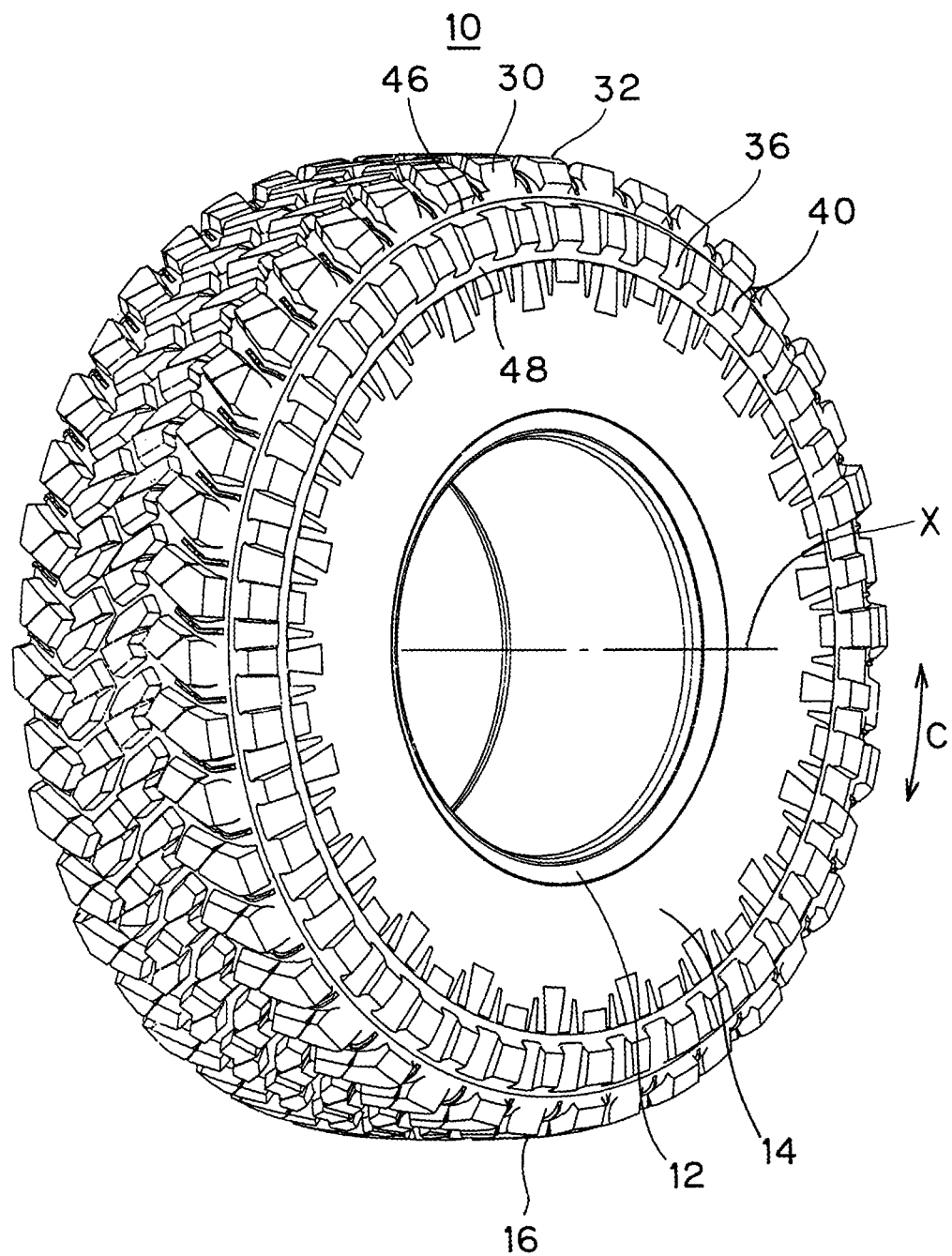
FIG. 1 is a perspective view of a pneumatic radial tire according to an embodiment.

In an embodiment of the pneumatic radial tire, the inner thin wall part may be arranged on a central part in the radial direction, of a region sandwiched between the inner radius height and the maximum width position. In another embodiment, the outer thin wall part and the inner thin wall part may be respectively formed by an outer circumferential groove along the outer circumferential edge of the annular region and an inner circumferential groove along the inner circumferential edge of the annular region, on outer face of the tire, and the outer and inner circumferential groove may be recessed as compared to a base surface of the annular region. In this case, the base surface of the annular region may be provided as a table-top face of a table-shaped area raised from a bottom that appears as a straight line connecting groove bottoms of the outer circumferential groove and the inner circumferential groove in a cross-section of the tire, and each of the projections may protrude from the base surface.

Further, in an embodiment, each of the projections of the annular region may be substantially coincided with the first block or the second block as to face the first block or the second block in a tire meridian direction across the outer thin wall part. In another embodiment, the plural projections may include first and second projections that are alternately arranged in the circumferential direction, and a dimension of the second projection in the circumferential direction is larger than that of the first projection; and an interval of the projections as a gap distance between the first projection and the second projection may include a first interval and a second interval that has a tire circumferential direction size larger than that of the first interval, and the first interval and the second interval may be provided alternately in the circumferential direction. In another embodiment, the plural projections may include a first projection that is substantially coincided with the first block as to face the first block in a tire meridian direction across the outer thin wall part, and a second projection that has a tire circumferential direction dimension larger than that of the first projection and is substantially coincided with the second block as to face the second block in the tire meridian direction across the outer thin wall part, and the first projection and the second projection may be alternately arranged in the circumferential direction. In another embodiment, the carcass ply may include organic fibers. The above embodiments can appropriately be combined.

According to the embodiments, it is possible to provide a pneumatic radial tire which makes flexible tire deformation possible in running rough road having large unevenness, such as rocky area, in low inner pressure condition to improve road surface follow-up performance, thereby enhancing rough road run-through performance.

In detail, by the fact that the steel belt layer reinforcing the tread part includes three or less layers, rigidity of the tread surface is decreased, thereby deformation of the block can be made easy. Furthermore, by the fact that the first block and the second block are provided in a grounding edge region of the tread, by making the grounding edge in a concavo-convex shape in a tire circumferential direction, concentrated load is liable to be acted to the second block extending to the outside in the tire width direction. As a result, the second block is liable to be sunk toward an inner side in the tire radial direction. By the fact that the annular region in which plural projections are provided side by side in a circumferential direction and the outer thin wall part and the inner thin wall part, extending along the inner circumferential edge and the outer circumferential edge are appropriately arranged on the side wall part as described above, when external force is acted from a road surface under low inner pressure conditions, the outer thin wall part and the inner thin wall part become joints of deformation, and road surface follow-up performance is improved. That is, by the deformation of the second block by the concentrated load, the outer thin wall part compresses or buckling-deforms, and the inner thin wall part stretches or expansion-deforms. Therefore, deformation force of the second block can be parried to the inner side in the tire radial direction, and depression deformation of the second block can become easy. As a result, deformation of the block on the tread surface can be increased under low inner pressure conditions, thereby improving road surface follow-up performance on uneven road surface such as rocky area, and running performance can be enhanced.

The pneumatic radial tire 10 according to an embodiment is described below with reference to FIGS. 1 to 8.

The pneumatic radial tire 10 according to the embodiment is a tire for running rough road having large unevenness, such as rocky area, and is a pneumatic radial tire for running rough road, suitable for off-road races mainly including running on rocky area, for vehicles dispatched to disaster site, and the like.

The radial tire 10 includes a pair of left and right bead parts 12, a pair of left and right side wall parts 14 each extending from one of those bead parts 12 to the outer side Ko in a tire radial direction, and a tread part 16 connecting both outer edges in a radial direction of those side wall parts 14, and the tread part 16 constitutes a ground plane.

The radial tire 10 is equipped with a toroidal carcass ply 18 extending over between a pair of the bead parts 12. The carcass ply 18 extends from the tread part 16 through the side wall parts 14, and is locked by the bead part 12. An annular bead core 20 is embedded in the bead part 12. Both edges of the carcass ply 18 are locked by turning up from the inside to the outside around the bead core 20. Therefore, the carcass ply 18 has turn-up part 18A at the both edges.

The carcass ply 18 includes organic fibers. In detail, the carcass ply 18 is a rubber-cord composite member in which organic fiber cords are arranged at an angle of from 70 to 90° to a tire circumferential direction, and is constituted of at least one ply, generally one ply or two ply. The organic fibers include polyester, rayon and nylon. When the radial carcass ply 18 including the organic fibers is used, bending rigidity of the side wall part 14 can be reduced. That is, for example, in the case of using a steel carcass ply, contribution to bending rigidity of the steel carcass ply itself is higher than contribution of rigidity change by wall thickness of the side wall part. For this reason, in the case that steel is used as a carcass ply, bending rigidity of the side wall part is high, and flexible change of tread surface becomes difficult to obtain.

A belt 22 is provided at an outer circumferential side of the carcass ply 18 in the tread part 16. That is, the belt 22 is provided between the carcass ply 18 and a tread rubber 24 in the tread part 16. The belt 22 includes three or less steel belt layers in which steel cords are arranged at an angle of from 10 to 35° to a tire circumferential direction. In this example, the belt 22 is formed by two layers of steel belt layers 22A and 22B.

Thus, when the belt 22 reinforcing the treat part 16 is constituted of a steel belt layer, running performance of a general road can be improved. In the case that the belt is not constituted of the steel belt layer, reinforcement of the tread part 16 is insufficient, and the problem arises on durability of the tread part 16 during running the general paved road. In addition of the steel belt layers 22A and 22B, when the constitution of the carcass ply 18 including the organic fibers is employed, reinforcement of the treat part 16 is achieved by the steel belt layers 22A and 22B while reducing bending rigidity of the side wall part 14, thereby running performance of general road and road surface follow-up performance of the tread surface during low pressure running can be enhanced.

Figure 3:
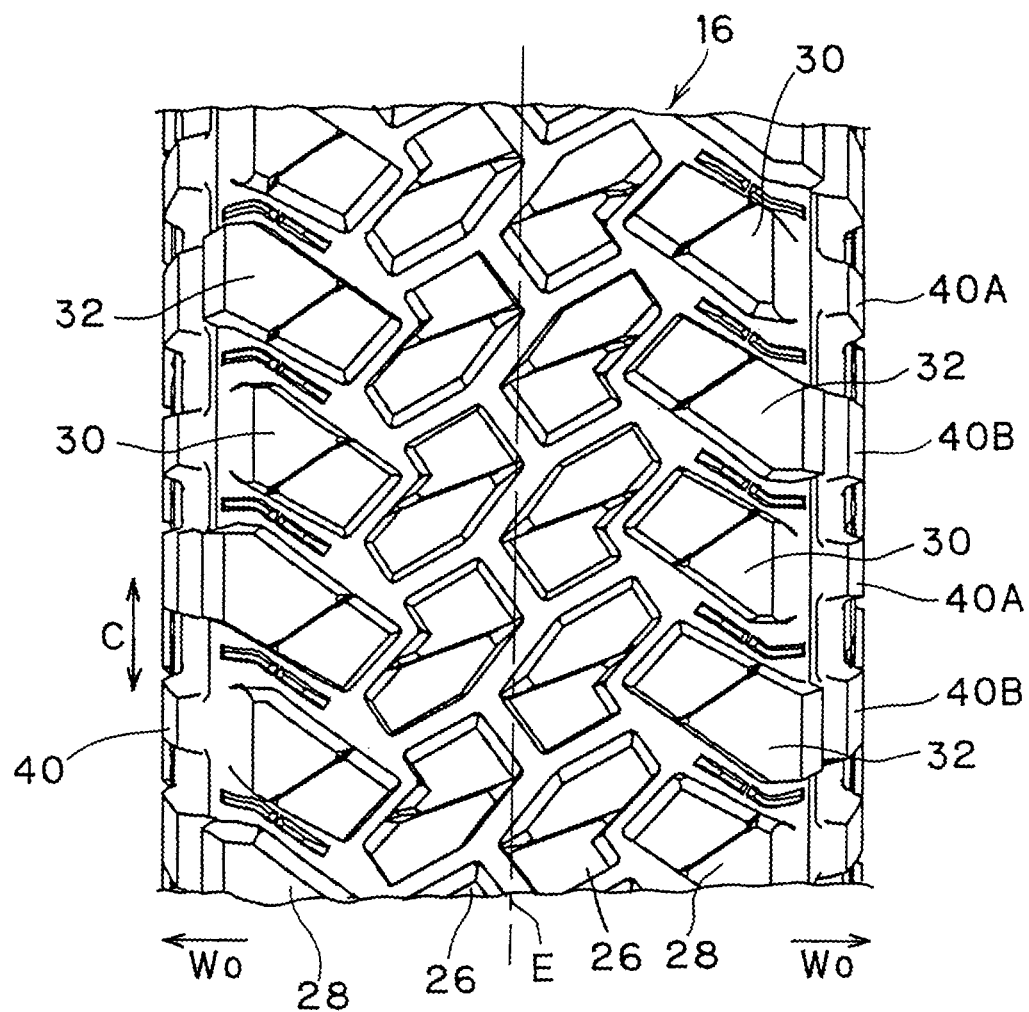
FIG. 3 is an enlarged plane view of a principal part of the tire.

The tread part 16 is equipped with plural blocks partitioned by main grooves extending along a tire circumferential direction and transverse grooves crossing with the main grooves and extending, on the surface of a tread rubber 24, that is, a tread surface. In this example, as shown in FIG. 3, the tread part 16 has four block rows of a pair of central block rows 26, 26 positioned at both sides crossing a tire equatorial plane E, and a pair of shoulder block rows 28, 28 positioned at ground edge region (shoulder region) of the both sides. However, if the tread part has a block shape independent in a tire circumferential direction and width direction on at least the ground edge region, the tread pattern of the central part is not particularly limited.

In the shoulder block row 28, the edge position of the block edge at the ground edge side is set so as to change the distance from the tire equatorial plane E, and by this constitution, the block edge at the ground edge side has concavo-convex shape in the tire circumferential direction C. In detail, in the shoulder block row 28, a first block 30 and a second block 32 are alternately arranged in the tire circumferential direction C, and the second block 32 extends to an outer side Wo in a tire width direction W than the first block 30. The tire width direction W is a direction parallel to the tire axis X. The circumferential direction C is a direction running along a circle or an arc centered on the tire axis X.

Figure 5:
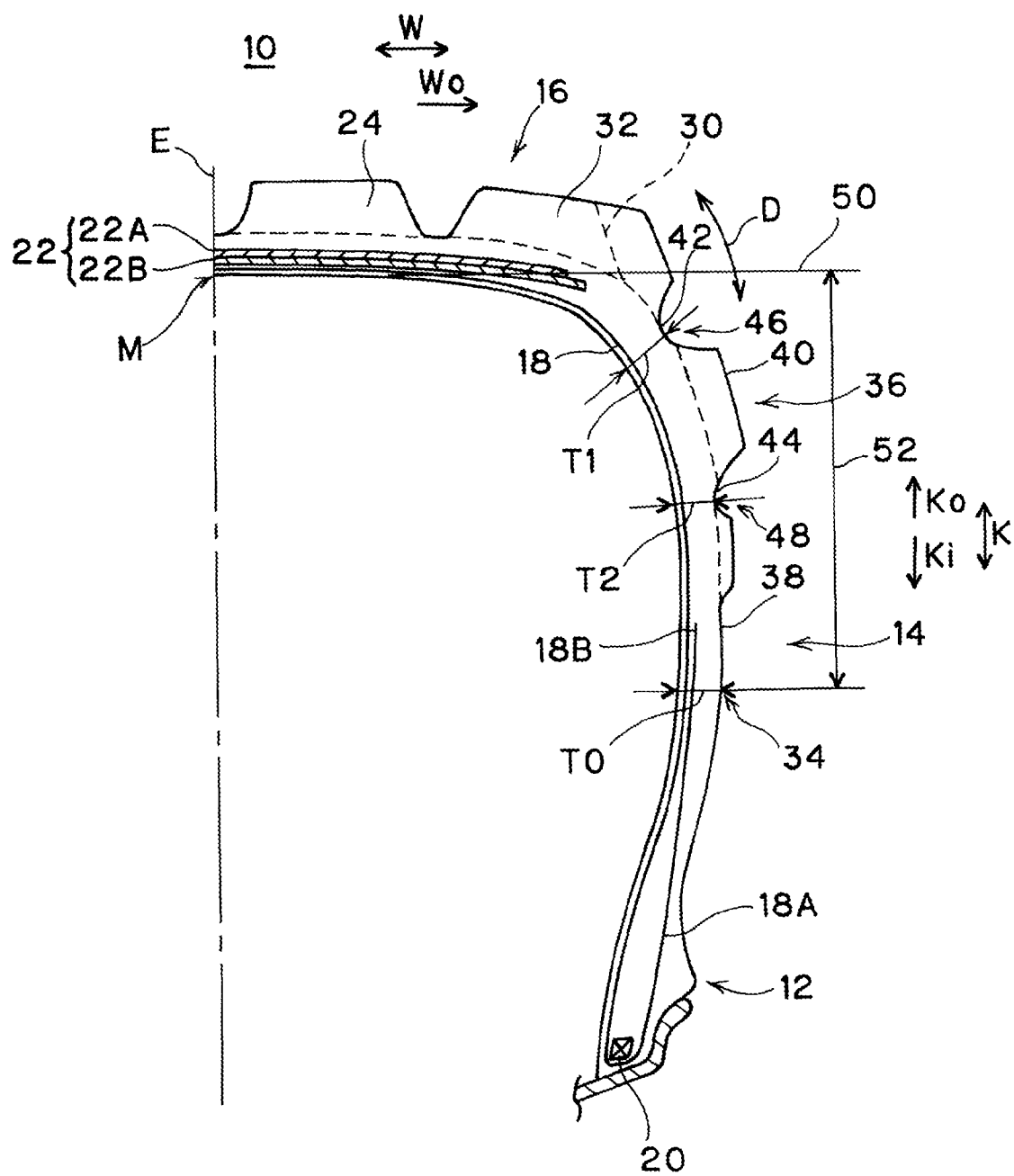
FIG. 5 is a meridian cross-sectional view (right-half cross-sectional view) of the tire.
Figure 6:
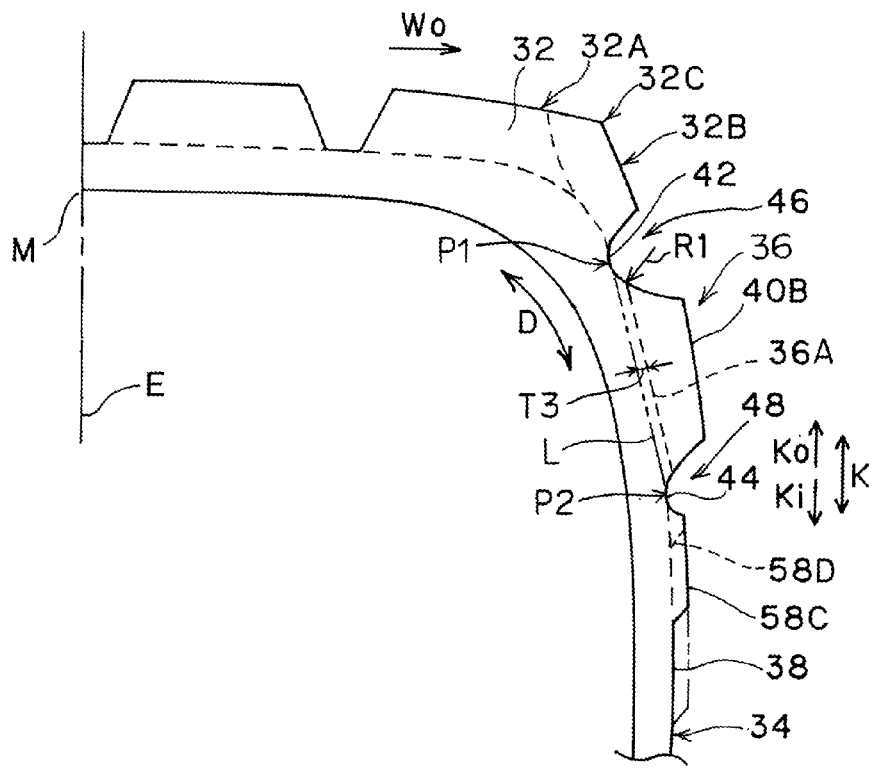
FIG. 6 is a cross-sectional view taken along VI-VI line in FIG. 4.
Figure 7:
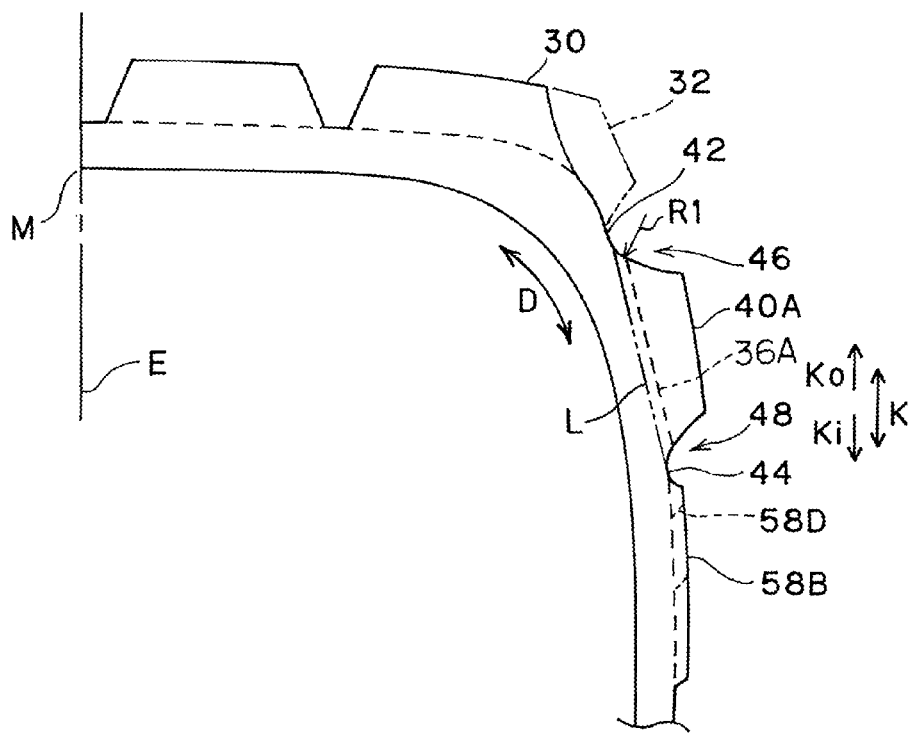
FIG. 7 is a cross-sectional view taken along VII-VII line in FIG. 4.

As shown in FIG. 5, the second block 32 has a block edge apart from the tire equatorial plane E at a distance larger than that of the first block 30. That is, the second block 32 has outer end face arranged at outside, in the tire width direction W, of respective outer face of the first block 30. The second block 32 is therefore a block having large length of the tire width direction W, and is formed projecting to the outer side Wo in the tire width direction. As shown in FIG. 6, the second block 32 includes a ground plane part 32A constituting ground plane in smooth road surface, and an inclined surface part 32B which is inclined in the outer side Wo in the tire width direction and the inner side Ki in a radial direction through the ground edge 32C of the ground plane part 32A.

In the side wall part 14, an annular region 36 extending over the entire circumference in a tire circumferential direction C is provided on an outer surface. The annular region 36 is arranged at an outer side Ko in a radial direction K, of a maximum width position 34. Plural projections 40 are arranged side by side on the annular region 36 in the tire circumferential direction C.

The maximum width position (that is, tire maximum cross-section width position) 34 used herein is a position that a tire outer surface, that is, a general outer surface 38 of the side wall side 14, is most apart from the tire equatorial plane E. The general outer surface 38 used herein is an outer surface part of a main body of the side wall part excluding projections and the like, and generally has a meridian cross-sectional shape prescribed by smoothly connecting plural arcs. Accordingly, the maximum width position 34 has a maximum outer width in the tire width direction W when projections on outer face of the tire are excluded.

The projections 40 are convex portions divided in the tire circumferential direction C and independently formed to each other, and are juxtaposed over the entire circumference of the annular region 36, as shown in FIG. 1. The projections 40 are provided on a base surface 36A of the annular region 36, and are provided over the entire width of the annular region 36 in the tire radial direction K. Projecting amount of the projections 40 is not particularly limited, but is set such that wall thickness of the side wall part 14 in the part having the projections 40 provided thereon is preferably 1.5 times or more, and more preferably from 2 to 3 times, wall thicknesses T1 and T2 (see FIG. 5) of an outer thin wall part 46 and an inner thin wall part 48 described hereinafter. This makes it possible to have rigidity difference due to thickness difference from the outer thin wall part 46 and the inner thin wall part 48, and deformation in the outer thin wall part 46 and the inner thin wall part 48 becomes easy to develop.

Circumferential grooves 42 and 44 recessed as compared to the base surface 36A of the annular region 36 are provided on the outer circumferential side and the inner circumferential side of the annular region 36, respectively. That is, the annular region 36 is a region sandwiched by both circumferential grooves 42 and 44 between the circumferential grooves 42 and 44, and the base surface 36A of the annular region 36 is formed by being slightly raised from the groove bottom of both circumferential grooves 42 and 44.

In the present embodiment, in the annular region 36, the base surface 36A is formed into a table-top face of a table-shaped area (that is, platform-shaped area) having increased wall thickness (that is, raised) to the general outer surface 38 of the side wall part 14, as shown in FIG. 6. In detail, in the tire meridian cross-section shown in FIG. 6, a groove bottom of the outer circumferential groove 42 (the deepest point of the groove) is designated as P1, the groove bottom of the inner circumferential groove 44 is designated P2, and a straight line connecting P1 and P2 is designated as L. In this example, the groove bottoms P1 and P2 are positioned on the general outer surface 38 of the side wall part 14. In this case, the base surface 36A of the annular region 36 is formed by building up in a cross-sectional table shape so as to project to the tire outer surface side relative to the straight line L. The thickness T3 of the padding to the straight line L is preferably from 1 to 5 mm, and more preferably from 2 to 4 mm. In the present embodiment, the base surface 36A is formed linearly in parallel to the straight line L in the tire meridian cross-sectional shape, but may be formed in a curved line shape which slightly expands to the tire outer surface side.

The outer circumferential groove 42 recessed relative to the annular region 36 is formed over the entire circumference along an outer circumferential edge of the annular region 36. The outer circumferential groove 42 is formed by being sandwiched between the annular region 36 (in more detail, projections 40 formed thereon) and the shoulder block row (in more detail, side surfaces of the first and second blocks 30 and 32). By this constitution, the outer thin wall part 46 continuing in the tire circumferential direction C along the outer circumferential edge of the annular region 36 is provided over the entire circumference. The outer thin wall part 46 is a part where an average wall thickness in the tire circumferential direction C is smaller than that of a part adjacent to the inner circumferential side and the outer circumferential side. That is, the annular region 36 equipped with the projections 40 is provided at the inner circumferential side of the outer thin wall part 46, and the average wall thickness in the circumferential direction C is larger than the wall thickness T1 of the outer thin wall part 46. The second block 32 extending to the outer side Wo in the tire width direction is present at the outer circumferential side of the outer thin wall part 46, and the average wall thickness in the circumferential direction C is larger than the wall thickness T1 of the outer thin wall part 46. The thin wall part sandwiched between them is the outer thin wall part 46.

The inner circumferential groove 44 recessed relative to the annular region 36 is formed over the entire circumference along the inner circumferential edge of the annular region 36. The inner circumferential groove 44 is formed by being sandwiched between the annular region 36 (in more detail, projections 40 formed thereon) and protector 58 described hereinafter. By this constitution, the inner thin wall part 48 continuing in the tire circumferential direction C along the inner circumferential edge of the annular region 36 is provided over the entire circumference. The inner thin wall part 48 is a part in which the average wall thickness in the tire circumferential direction C is set to be smaller than that of the parts adjacent to the inner circumferential side and the outer circumferential side. That is, the annular region 36 equipped with the projections 40 is provided at the outer circumferential side of the inner thin wall part 48, the protector 58 is present at the inner circumferential side, and the average wall thickness in the circumferential direction C thereof are larger than the wall thickness T2 of the inner thin wall part 48. The thin wall part sandwiched between them is the inner thin wall part 48.

The wall thickness T1 of the outer thin wall part 46 and the wall thickness T2 of the inner thin wall part 48 are set to be roughly equal to the wall thickness T0 in the maximum width position 34 (see FIG. 5), and by this constitution, the outer thin wall part 46 and the inner thin wall part 48 constitute a low rigidity region having small bending rigidity. The wall thickness T0 in the maximum width position 34 is a thickness of the side wall part main body excluding the protector 58 in the case where the protector 58 described hereinafter is present at the maximum width position 34. The wall thicknesses T1 and T2 of the outer thin wall part 46 and the inner thin wall part 48 are preferably a range of from 0.7 to 1.3 times the wall thickness T0 in the maximum width position 34.

The outer thin wall part 46 and the inner thin wall part 48 are provided between an inner radius height 50 and the maximum width position 34, as shown in FIG. 5. The inner radius height 50 used herein is a height from a tire axis X and is tantamount to a maximum inner radius of the tire about the tire axis X. That is, the inner radius height 50 is a position in a radial direction corresponding to a tire inner diameter point M. The tire inner diameter point M used herein is a point at which the tire inner surface is most apart from a tire axis X in a tire height direction, and is generally a point on an equatorial plane E on the tire inner surface.

The outer thin wall part 46 and the inner thin wall part 48 are sites becoming joints of deformation in order to improve road surface follow-up performance when external force from the road surface is acted under low inner pressure conditions. That is, when concentrated load is acted to the second block 32, the outer thin wall part 46 is compression- or buckling-deformed so as to close the outer circumferential grooves 42, and the inner thin wall part 48 is stretch- or expansion-deformed so as to open the inner circumferential grooves 44. To achieve those actions, the outer thin wall part 46 and the inner thin wall part 48 are arranged as follows.

The inner thin wall part 48 is arranged at the central part in a tire radial direction K of a region 52 sandwiched between the inner radius height 50 and the maximum width position 34. In detail, the inner thin wall part 48 (in more detail, groove bottom P2 of the inner circumferential groove 44) is preferably set at a position of 30 to 60% of the width of the region 52 toward the outer side Ko in the tire radial direction from the maximum width position 34. More preferably, the inner thin wall part 48 is set at an intermediate point between the inner radius height 50 and the maximum width position 34, which divides substantially equally the region 52.

The outer thin wall part 46 is provided on a buttress surface of the side wall part 14, and is arranged close to the inner radius height 50 and inside (that is, the inner side Ki in the tire radial direction) of the inner radius height 50. That is, the outer thin wall part 46, in detail, the groove bottom P1 of the outer circumferential grove 42, is provided so as to locate in the vicinity of the inner radius height 50, although it locates on the inner side Ki in the tire radial direction than the inner radius height 50. The inner radius height 50 is nearly consistent with a radial direction position of the edge of the steel belt layers 22A and 22B, and has high rigidity. By providing the outer thin wall part 46 having low rigidity adjacent to the inner side Ki in a radial direction of the region having high rigidity, the outer thin wall part 46 becomes easy to be a joint of deformation. The outer thin wall part 46, in detail, the groove bottom P1, is preferably set to a position of 80% or more of the width of the region 52 toward the outer side Ko in the tire radial direction from the maximum width position 34.

Distance between the outer thin wall part 46 and the inner thin wall part 48 is not particularly limited, but is preferably 20 mm or more, and more preferably 30 mm or more, in terms of a distance between the groove bottoms P1 and P2 of those parts. By thus separating those parts, those parts easily exhibit the action as the joints of deformation. The upper limit of the distance is not particularly limited, but is generally 70 mm or less.

Curvature radius of the groove bottoms of the circumferential grooves 42 and 44 is preferably 3 mm or more. The curvature radius R1 (see FIGS. 6 and 7) of a base part at the projection 40 side of the outer circumferential groove 42 is preferably 5 mm or more. Thus, larger curvature radius particularly improves fatigue by buckling in the outer thin wall part 46, and can suppress occurrence of cracks.

To effectively function as the joints of deformation, rigidity, that is, wall thickness, is preferably changed as quickly as possible, not gradually changed. Where the curvature radius of the grove bottom exceeds 10 mm, the change of wall thickness becomes mild, and the effect as the joints of deformation may be reduced. Therefore, the curvature radius is preferably 10 mm or less.

Figure 2:
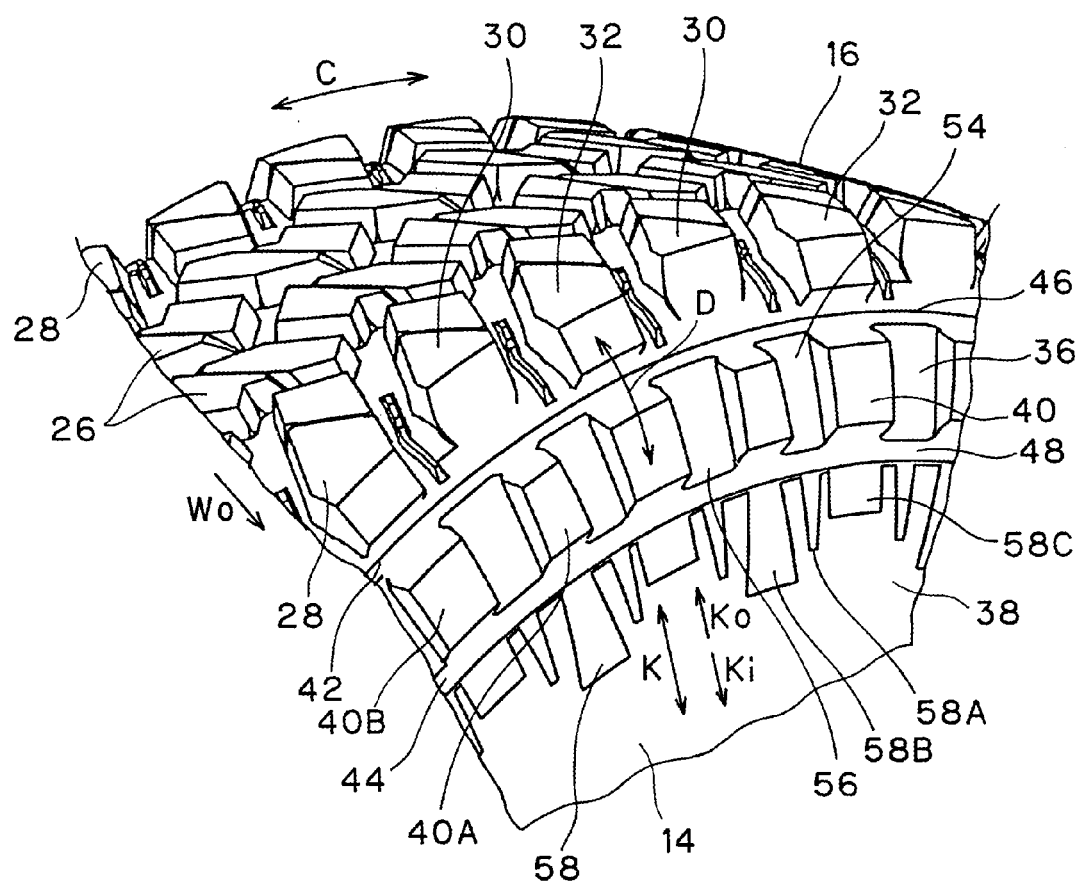
FIG. 2 is an enlarged perspective view of a principal part of the tire.
Figure 4:
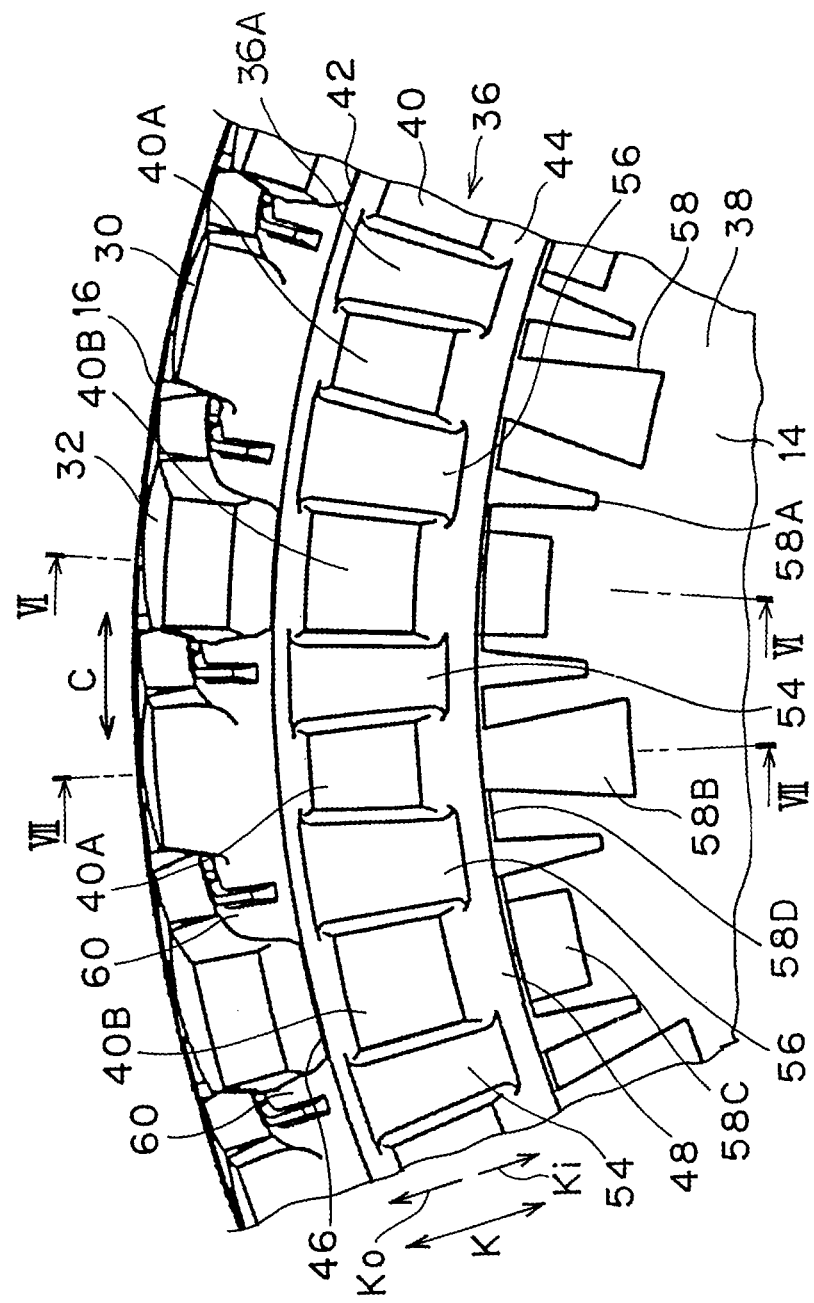
FIG. 4 is an enlarged side view of a principal part of the tire.

As shown in FIGS. 2 and 4, each of the projections 40 is substantially coincided with each block (that is, first block 30 or second block 32) of a shoulder block row 28 as to face each block in a tire meridian direction D across the outer thin wall part 46.

In detail, the plural projections 40 include a first projection 40A (see FIGS. 2, 4 and 7) that is substantially coincided with the first block 30 as to face the first block 30 in the tire meridian direction D across the outer thin wall part 46 and a second projection 40B (see FIGS. 2, 4 and 6) that is substantially coincided with the second block 32 as to face the second block 32 in the tire meridian direction D across the outer thin wall part 46, and the first projection 40A and the second projection 40B are alternately provided in the tire circumferential direction C.

As shown in FIGS. 2 and 4, the second projection 40B is set such that the dimension in the tire circumferential direction C is larger than that of the first projection 40A. Therefore, the projections 40 provided in the annular region 36 are arranged in the repetition of large projection, small projection, large projection and small projection in the tire circumferential direction C. Furthermore, the projection facing the second block 32 forming a convex shape in the tread ground edge is a "large projection", that is, the second projection 40B having large circumferential direction dimension, and the projection facing the first block 30 forming a concave shape in the tread ground edge is a "small projection", that is, the first projection 40A having small circumferential direction dimension. In more detail, the second projections 40B are set such that their tire circumferential direction dimensions are the same to the second block 32, and the first projections 40A are set such that their tire circumferential direction dimensions are short to the first block 30.

The intervals in the tire circumferential direction C of the projections 40 are arranged by repetition of "large", "small", "large" and "small". That is, the interval as a gap distance between the first projection 40A and the second projection 40B includes a first interval 54 and a second interval 56 that has a tire circumferential direction size larger than that of the first interval 54, and the first interval 54 and the second interval 56 are alternately set in the tire circumferential direction C. Those intervals 54 and 56 are set at a position facing each transverse groove 60 by corresponding to the plural transverse grooves 60 in the shoulder block row (see FIG. 4).

As shown in FIG. 5, a turn-up edge 18B of the carcass ply 18 is set in a region between the maximum width position 34 which has the smallest wall thickness in the side wall part 14, and the inner thin wall part 48, particularly at an intermediate position between the maximum width position 34 and the inner thin wall part 48. By this constitution, strain at the turn-up edge 18B of the carcass ply 18 can be suppressed.

As shown in FIGS. 4 to 7, the protector 58 is provided at the inner side Ki in the tire radial direction of the inner thin wall part 48 on the outer surface of the side wall part 14. The protector 58 is a convex part protecting the side wall part 14 from external damage factor, and is set such that the projection height is lower than that of the projection 40 provided in the annular region 36. The protector 58 includes a circumferential projection 58D annularly extending along the inner circumferential edge of the inner circumferential groove 44, and plural radial projections 58A to 58C with a distance in the tire circumferential direction C extending toward the inner side Ki in the tire radial direction from the circumferential projection 58D.

The radial projections 58A to 58C are provided one by one at positions facing the projections 40 and each of the intervals 54 and 56 therebetween. In detail, the radial projection includes the first radial projection 58A provided at a position facing each of the intervals 54 and 56, and the second and third radial projections 58B and 58C provided so as to alternately be present between the first radial projections 58A. The second radial projection 58B is provided at a position facing the first projection 40A, and the third radial projection 58C is provided at a position facing the second projection 40B. Those second and third radial projections are set such that the areas are larger than that of the first radial projection 58A as viewed from the tire side surface. In this example, the second radial projection 58B is set such that extending length to the inner side Ki in the tire radial direction is larger that of the third radial projection 58C.

The maximum width position 34, the tire inner diameter point M and the inner radius height 50 in the above description, and the above-described each preferred dimension value are those in an unloaded normal state in which a tire is mounted on a normal rim and normal inner pressure is charged. The normal rim is a rim that in the standard system containing a standard on which a tire is based, the standard determines every tire. For example, in JATMA, it means standard rim, in TRA, it means "Design Rim", or in ETRTO, it means "Measuring Rim". Furthermore, the normal inner pressure is air pressure that in the standard system containing a standard on which a tire is based, the standard determines every tire. For example, in JATMA, it means the maximum air pressure, in TRA, it means the maximum value shown in the table "TIRE LOAD LIMITS AT VARIOUS COLD INFLATION PRESSURES", and in ETRTO, it means "INFLATION PRESSUER".

According to the pneumatic radial tire 10 according to the embodiment described above, the steel belt layers 22A and 22B reinforcing the tread part 16 include three or less layers, particularly two layers. As a result, rigidity of the tread surface can be decreased, and deformation of the blocks 30 and 32 becomes easy. Where the steel belt layer includes four or more layers, surface rigidity of the tread part becomes too large, and local depression deformation of the block into the inner side Ki in the tire radial direction is difficult to occur.

According to the present embodiment, the ground edge of the tread part 16 has a concavo-convex shape in the tire circumferential direction C. Due to this constitution, concentrated load is liable to act to the second block 32 extending to the outside Wo in the tire width direction. As a result, the second block 32 becomes easy to depress toward the inner side Ki in the tire radial direction.

In the side wall part 14, the annular region 36 juxtaposing the plural projections 40 in the tire circumferential direction C, and the outer thin wall part 46 and the inner thin wall part 48, along the inner circumferential edge and the outer circumferential edge are arranged as above. Therefore, when concentrated load is acted to the second block 32 under low inner pressure conditions, the outer thin wall part 46 compression- or buckling-deforms, and the inner thin wall part 48 stretch- or expansion-deforms. As a result, deformation force of the second block 32 can be parried in the inner side Ki in the tire radial direction, and depression deformation of the second block 32 becomes easy.

Figure 8:
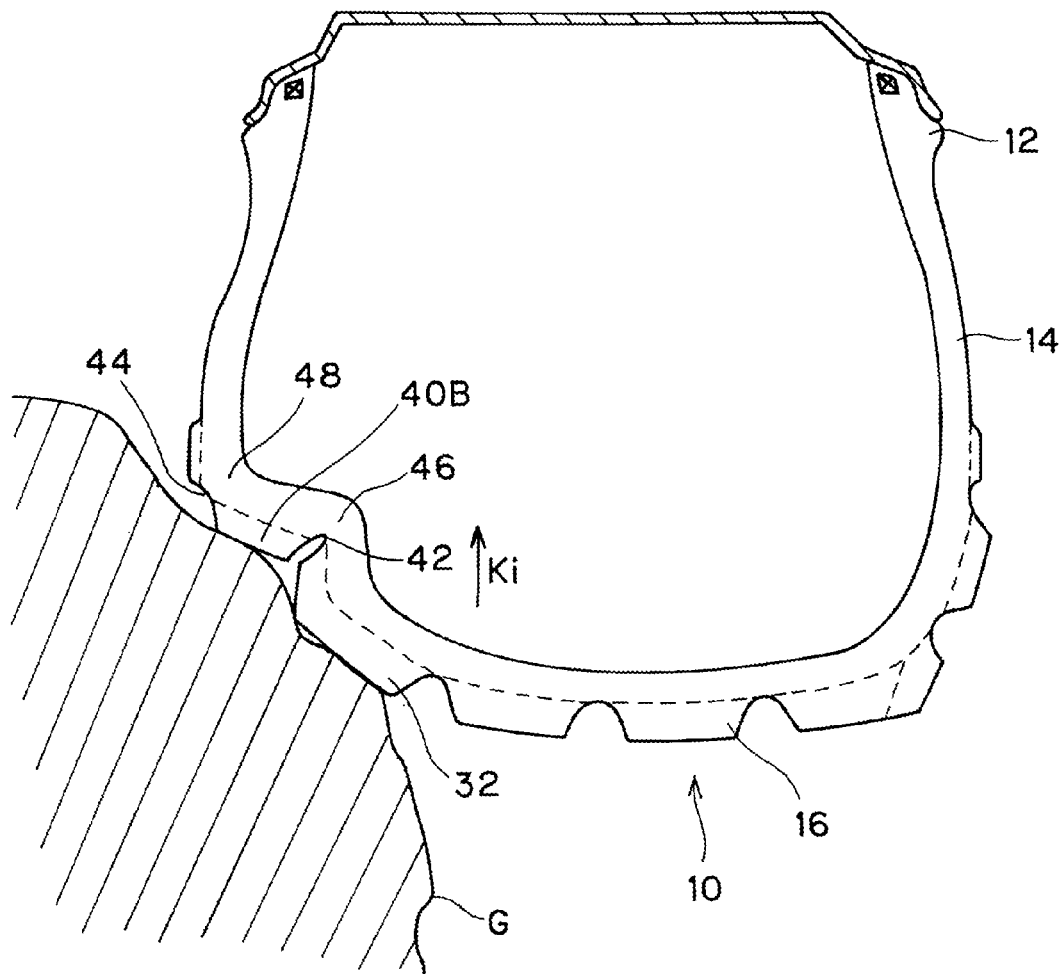
FIG. 8 is a cross-sectional view showing the state of the tire during running on rocky area under low inner pressure conditions.

In detail, in the case of considering bending rigidity of the side wall part 14 at the outer side Ko in a radial direction than the maximum width position 34, a region having the inner radius height 50 and the second block 32 of the outer side Ko in the tire radial direction than the inner radius height 50 constitutes a "high rigidity region", and a region just below the same constitutes a "low rigidity region" by the outer thin wall part 46. The annular region 36 at the inner circumferential side constitutes a "high rigidity region" by juxtaposing the projections 40, and the "low rigidity region" is formed at the inner circumferential side by the inner thin wall part 48. Thus, the outer thin wall part 46 and the inner thin wall part 48 constitute low rigidity region having relatively low bending rigidity, and those parts act as joints of deformation. Therefore, as shown in FIG. 8, when concentrated load acts to the second block 32 from rock G during running rocky area, it was confirmed that the outer thin wall part 46 buckled such that the outer circumferential groove 42 closed, and the inner thin wall part 48 stretch-deformed such that the inner circumferential groove 44 opened. That is, deformation force of the second block 32 to the inner side Ki in the tire radial direction was parried to the inner side Ki, and depression deformation of the second block 32 became easy. Therefore, the block 32 on the tread surface deforms so as to wrap a rock under low inner pressure conditions, ground condition so as to become surface contact between the tread surface and rock surface is easy to be realized, and road surface follow-up performance is improved on uneven road surface such as rocky area, thereby running performance can be enhanced.

The base surface 36A of the annular region 36 on which the projections 40 are provided is formed in a table shape slightly raised to the tire outer surface side. From this point, bending rigidity of the annular region 36 can be enhanced, and stress concentration to the circumferential grooves 42 and 44 can further effectively be performed, which is preferred.

Furthermore, because the projections 40 are provided facing each of the blocks 30 and 32 of the tread ground edge, the following effects are exhibited. That is, when concentrated load acts to the second block 32 under low inner pressure condition, in order to buckle the outer thin wall part 46, it is effective to enhance rigidity of the inner side Ki in the radial direction of the outer thin wall part 46. According to the above constitution, the projections 40 are provided facing each of the blocks 30 and 32, and rigidity of the inner side Ki in the radial direction is increased. As a result, the outer thin wall part 46 can more effectively be buckled.

Particularly, in the above embodiment, the projections 40 facing the second block 32 having a convex shape at the tread ground edge are second projections 40B having large circumferential direction dimension, and the projections 40 facing the first block 30 having a concave shape are first projections 40A having small circumferential direction dimension. Thus, the large second projections 40B are provided at the second block 32 side to which external force easily acts, thereby rigidity of the inner side Ki in the radial direction is increased. As a result, the second block 32 can further effectively be depression-deformed, and local deformation centering this part becomes possible in the circumferential direction C and the width direction W of the tire. As a result, deformation so as to wrap acute-angled rock becomes further easy.

The ground edge of the tread part 16 has a concavo-convex shape in the tire circumferential direction C, and this constitution increases the distance between the blocks at the ground edge (in detail, distance between the second blocks 32 projected to the outer side Wo in the width direction). As a result, catching property to road surface projections can be improved, and relatively large stones can be fitted in a space between the blocks without running on the stones. The projections 40 provided on the annular region 36 are arranged with the repetition of "large", "small", "large" and "small" in the tire circumferential direction C, and the intervals 54 and 56 are also provided in the repetition of "large", "small", "large" and "small". Therefore, catching property to large projections can be improved.

The projections 40 provided on the annular region 36 can develop driving performance on a muddy ground by the fact that the tire 10 sinks by the weight of vehicles and becomes a state embedded in mud when running on the muddy ground. Furthermore, in the present embodiment, because the tread ground edge is formed into a concavo-convex shape in the tire circumferential direction C, mud removal property on the muddy ground can be improved.

As described above, according to the present embodiment, running performance on a rocky area in low inner pressure and low speed can greatly be improved. As a result, the tire can preferably be used for light tracks such as pick-up tracks, for example, for off-road races mainly including rock area running, and for vehicles dispatched to disaster site.

Inner pressure charging condition in rocky area running can be determined so that the proportion of load applied to the tire and the fitting of the bead part can be sustained. A tire mounted on a vehicle specialized in rocky area running is generally a large-sized tire in order to secure road clearance of a vehicle. From this fact, allowable load applied due to the increase in inner volume of a tire tends to be increased. As a result, the proportion of the load applied to the tire is from about 10 to 20%. Furthermore, running speed on a rocky area is generally from 1 to 2 km/hr. Therefore, it is possible to appropriately decrease air pressure according to the load applied. For example, excessively low inner pressure condition greatly increases a concern that the fitting of bead parts unfastens. Therefore, the inner pressure is generally about 150 kPa. However, in the case of special uses such as races, the inner pressure can be decreased to about 50 kPa by mechanically fastening the bead part to a rim, that is, by applying bead lock rim. Of course, the pneumatic tire of the present embodiment can be applied to the running on a muddy ground, a sand ground and the like as well as general paved roads by charging normal inner pressure of about 450 kPa.

Although the embodiments have been described in detail, the present invention is not limited to the embodiments shown in the drawings, and various modifications or changes can be made without departing the spirit and scope of the invention.

What is claimed is:

1. A pneumatic radial tire having
a tire axis,
a tire width direction parallel to the tire axis,
a circumferential direction running along a circle or an arc centered on the tire axis,
an inner radius height that is a height from the tire axis and is tantamount to a maximum inner radius of the tire about the tire axis, and
a maximum width position having a maximum outer width in the tire width direction when projections on outer face of the tire are excluded,
comprising:
a pair of bead parts;
a pair of side wall parts each extending from one of the bead parts to a respective side wall outer edge in a radial direction;
a tread part connecting both side wall outer edges of the side wall parts and having a grounding edge region adjacent to the side wall outer edge;
a carcass ply extending through the side wall part from the tread part and locked by the bead part;
three or less steel belt layers arranged at outer circumferential side of the carcass ply in the tread part;
first and second blocks alternately arranged in the circumferential direction in the grounding edge region of the tread part, the second blocks having outer end faces arranged at outside, in the tire width direction, of respective outer faces of the first blocks;
an annular region extending over the entire circumference in the circumferential direction on an outer surface of the side wall part and having a plurality of projections that are arranged side by side in the circumferential direction, the annular region being arranged at outside of the maximum width position, in the radial direction;
an outer thin wall part continuing in the circumferential direction along an outer circumferential edge of the annular region, the outer thin wall part being arranged in vicinity of the inner radius height and inside of the inner radius height; and an inner thin wall part continuing in the circumferential direction along an inner circumferential edge of the annular region, wherein the outer thin wall part is an annular part where an average wall thickness in the tire circumferential direction is smaller than that of parts adjacent to an inner circumferential side and an outer circumferential side of the outer thin wall part, and the inner thin wall part is an annular part where an average wall thickness in the tire circumferential direction is smaller than that of parts adjacent to an inner circumferential side and an outer circumferential side of the inner thin wall part.

2. The pneumatic radial tire according to claim 1, wherein the inner thin wall part is arranged on a central part in the radial direction, of a region sandwiched between the inner radius height and the maximum width position.

3. The pneumatic radial tire according to claim 1, wherein the outer thin wall part and the inner thin wall part are respectively formed by an outer circumferential groove along the outer circumferential edge of the annular region and an inner circumferential groove along the inner circumferential edge of the annular region, on outer face of the tire; and the outer and inner circumferential grooves are recessed as compared to a base surface of the annular region.

4. The pneumatic radial tire according to claim 3, wherein the base surface of the annular region is provided as a table-top face of a table-shaped area raised from a bottom that appears as a straight line connecting groove bottoms of the outer circumferential groove and the inner circumferential groove in a cross-section of the tire, and each of the projections protrudes from the base surface.

5. The pneumatic radial tire according to claim 1, wherein each of the projections of the annular region is substantially coincided with the first block or the second block as to face the first block or the second block in a tire meridian direction across the outer thin wall part.

6. The pneumatic radial tire according to claim 1, wherein a plurality of the projections comprises first and second projections that are alternately arranged in the circumferential direction, and a dimension of the second projection in the circumferential direction is larger than that of the first projection; and an interval of the projections as a gap distance between the first projection and the second projection comprises a first interval and a second interval that has a tire circumferential direction size larger than that of the first interval, and the first interval and the second interval are provided alternately in the circumferential direction.

7. The pneumatic radial tire according to claim 1, wherein a plurality of the projections comprises a first projection that is substantially coincided with the first block as to face the first block in a tire meridian direction across the outer thin wall part, and a second projection that has a tire circumferential direction dimension larger than that of the first projection and is substantially coincided with the second block as to face the second block in the tire meridian direction across the outer thin wall part, and the first projection and the second projection are alternately arranged in the circumferential direction.

8. The pneumatic radial tire according to claim 7, wherein an interval of the projections as a gap distance between the first projection and the second projection comprises a first interval and a second interval that has a tire circumferential direction size larger than that of the first interval, and the first interval and the second interval are provided alternately in the circumferential direction.

9. The pneumatic radial tire according to claim 1, wherein the carcass ply comprises organic fibers.

10. A pneumatic radial tire having
a tire axis,
a tire width direction parallel to the tire axis,
a circumferential direction running along a circle or an arc centered on the tire axis,
an inner radius height that is a height from the tire axis and is tantamount to a maximum inner radius of the tire about the tire axis, and
a maximum width position having a maximum outer width in the tire width direction when projections on outer face of the tire are excluded,
comprising:
a pair of bead parts;
a pair of side wall parts each extending from one of the bead parts to a respective side wall outer edge in a radial direction;
a tread part connecting both side wall outer edges of the side wall parts and having a grounding edge region adjacent to the side wall outer edge;
a carcass ply extending through the side wall part from the tread part and locked by the bead part;
three or less steel belt layers arranged at outer circumferential side of the carcass ply in the tread part;
first and second blocks alternately arranged in the circumferential direction in the grounding edge region of the tread part, the second blocks having outer end faces arranged at outside, in the tire width direction, of respective outer faces of the first blocks;
an annular region extending over the entire circumference in the circumferential direction on an outer surface of the side wall part and having a plurality of projections that are arranged side by side in the circumferential direction, the annular region being arranged at outside of the maximum width position, in the radial direction;
an outer thin wall part continuing in the circumferential direction along an outer circumferential edge of the annular region, the outer thin wall part being arranged in vicinity of the inner radius height and inside of the inner radius height; and
an inner thin wall part continuing in the circumferential direction along an inner circumferential edge of the annular region,
wherein the outer thin wall part and the inner thin wall part are respectively formed by an outer circumferential groove along the outer circumferential edge of the annular region and an inner circumferential groove along the inner circumferential edge of the annular region, on outer face of the tire; and the outer and inner circumferential grooves are recessed as compared to a base surface of the annular region.

11. The pneumatic radial tire according to claim 10, wherein the base surface of the annular region is provided as a table-top face of a table-shaped area raised from a bottom that appears as a straight line connecting groove bottoms of the outer circumferential groove and the inner circumferential groove in a cross-section of the tire, and each of the projections protrudes from the base surface.

12. The pneumatic radial tire according to claim 10, wherein each of the projections of the annular region is substantially coincided with the first block or the second block as to face the first block or the second block in a tire meridian direction across the outer thin wall part.

13. The pneumatic radial tire according to claim 10, wherein a plurality of the projections comprises first and second projections that are alternately arranged in the circumferential direction, and a dimension of the second projection in the circumferential direction is larger than that of the first projection; and an interval of the projections as a gap distance between the first projection and the second projection comprises a first interval and a second interval that has a tire circumferential direction size larger than that of the first interval, and the first interval and the second interval are provided alternately in the circumferential direction.

14. The pneumatic radial tire according to claim 10, wherein a plurality of the projections comprises a first projection that is substantially coincided with the first block as to face the first block in a tire meridian direction across the outer thin wall part, and a second projection that has a tire circumferential direction dimension larger than that of the first projection and is substantially coincided with the second block as to face the second block in the tire meridian direction across the outer thin wall part, and the first projection and the second projection are alternately arranged in the circumferential direction.

15. The pneumatic radial tire according to claim 14, wherein an interval of the projections as a gap distance between the first projection and the second projection comprises a first interval and a second interval that has a tire circumferential direction size larger than that of the first interval, and the first interval and the second interval are provided alternately in the circumferential direction.

16. The pneumatic radial tire according to claim 10, wherein the carcass ply comprises organic fibers.

* * * * *